US007993608B2

(12) United States Patent
Lee

(10) Patent No.: US 7,993,608 B2
(45) Date of Patent: Aug. 9, 2011

(54) FLUID INJECTION PORT

(75) Inventor: Harry Lee, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 546 days.

(21) Appl. No.: 12/188,162

(22) Filed: Aug. 7, 2008

(65) Prior Publication Data

US 2009/0038417 A1 Feb. 12, 2009

Related U.S. Application Data

(60) Provisional application No. 60/954,417, filed on Aug. 7, 2007.

(51) Int. Cl.
*B01L 99/00* (2010.01)
*G01N 1/38* (2006.01)

(52) U.S. Cl. ........ 422/546; 73/863; 73/864.63; 422/502

(58) Field of Classification Search .................... 73/863, 73/864, 864.61, 864.63, 864.65, 864.73, 73/864.81, 864.85–864.91; 422/502, 512, 422/537–538, 541, 546, FOR. 111
See application file for complete search history.

(56) References Cited

U.S. PATENT DOCUMENTS 3,369,345 A * 2/1968 Moore et al. .................... 95/257
4,244,478 A 1/1981 Handman
4,326,540 A * 4/1982 Bailey et al. .................. 600/576
4,440,550 A * 4/1984 Jenkins et al. .................... 95/89
4,522,411 A 6/1985 Burgan
5,518,331 A * 5/1996 Moosmann et al. .......... 401/230
5,814,025 A 9/1998 Severs
5,840,573 A 11/1998 Fields
7,223,363 B2 5/2007 McNeely et al.
2002/0121529 A1 9/2002 Hoummady
2005/0069462 A1* 3/2005 Humenik et al. ............. 422/400

FOREIGN PATENT DOCUMENTS

KR 10-2006-0080585 7/2006

OTHER PUBLICATIONS

Fredrickson et al., “Macro-to-micro interfaces for microfluidic devices,” Lab Chip, 4:526-533 (2004), published on the Web Nov. 2004.
Lee et al., “Microbioreactor arrays with integrated mixers and fluid injectors for high-throughput experimentation with pH and dissolved oxygen control,” Lab Chip, 6:1229-1235 (2006), published on the Web Jul. 2006.
Oh, et al., “World-to-chip microfluidic interface with built-in valves for multichamber chip-based PCR assays,” Lab Chip, 5:845-850 (2005), published on the Web Jun. 2005.
Written Opinion of the International Searching Authority from PCT/US2008/072535, mailed Jan. 16, 2009, 3 pages.
International Search Report from PCT/US2008/072535, mailed Jan. 16, 2009, 3 pages.

* cited by examiner

*Primary Examiner* — Thomas P Noland
(74) *Attorney, Agent, or Firm* — Choate, Hall & Stewart, LLP

(57) ABSTRACT

Fluid injection port. An elastomeric injection nipple is supported within a compression fitting and the injection nipple includes a slit. A first via is provided that connects the slit in the nipple to a flow channel leading into a fluid reservoir. A venting channel is provided in fluid communication with the fluid reservoir and also in fluid communication with a second via. When a pipette is inserted into the slit in the injection nipple, the nipple deforms allowing the second via to be in fluid communication with space on either side of the pipette tip whereby air can be discharged.

1 Claim, 1 Drawing Sheet

FLUID INJECTION PORT

This application is related to and claims priority to U.S. provisional application Ser. No. 60/954,417, filed Aug. 7, 2007, the entire contents of which is incorporated herein by reference. It is noted that certain information and/or data in the instant specification may supersede information and/or data in the earlier application, in which case the instant specification will control.

BACKGROUND OF THE INVENTION

Macroscopic fluidic interfaces are important for improving the usability of microfluidic devices. For example, prior art parallel integrated bioreactor arrays require two needle punctures to fill each fluidic reservoir, one for fluid injection using a syringe and another needle to vent the air displaced by the injected fluid. While suitable for internal laboratory use, such an inconvenient fluid injection procedure impedes the adoption of new bioreactor technology.

An object of the present invention is a fluid injection port that automatically vents the displaced air from a fluid reservoir and is compatible with standard laboratory pipette tips.

SUMMARY OF THE INVENTION

In one aspect, the invention is a fluid injection port including an elastomeric injection nipple supported within a compression fitting, the injection nipple including a slit therein. A first via connects the slit in the nipple to a flow channel leading into a fluid reservoir. A venting channel is in fluid communication with the fluid reservoir and also in fluid communication with a second via. Upon insertion of a pipette tip into the slit in the injection needle, the nipple deforms allowing the second via to be in fluid communication with space on either side of the pipette tip whereby air is discharged.

DETAILED DESCRIPTION OF THE PREFERRED EMBODIMENT OF THE INVENTION

Figures 1A, 1B, 2, 3A, 3B, 3C:
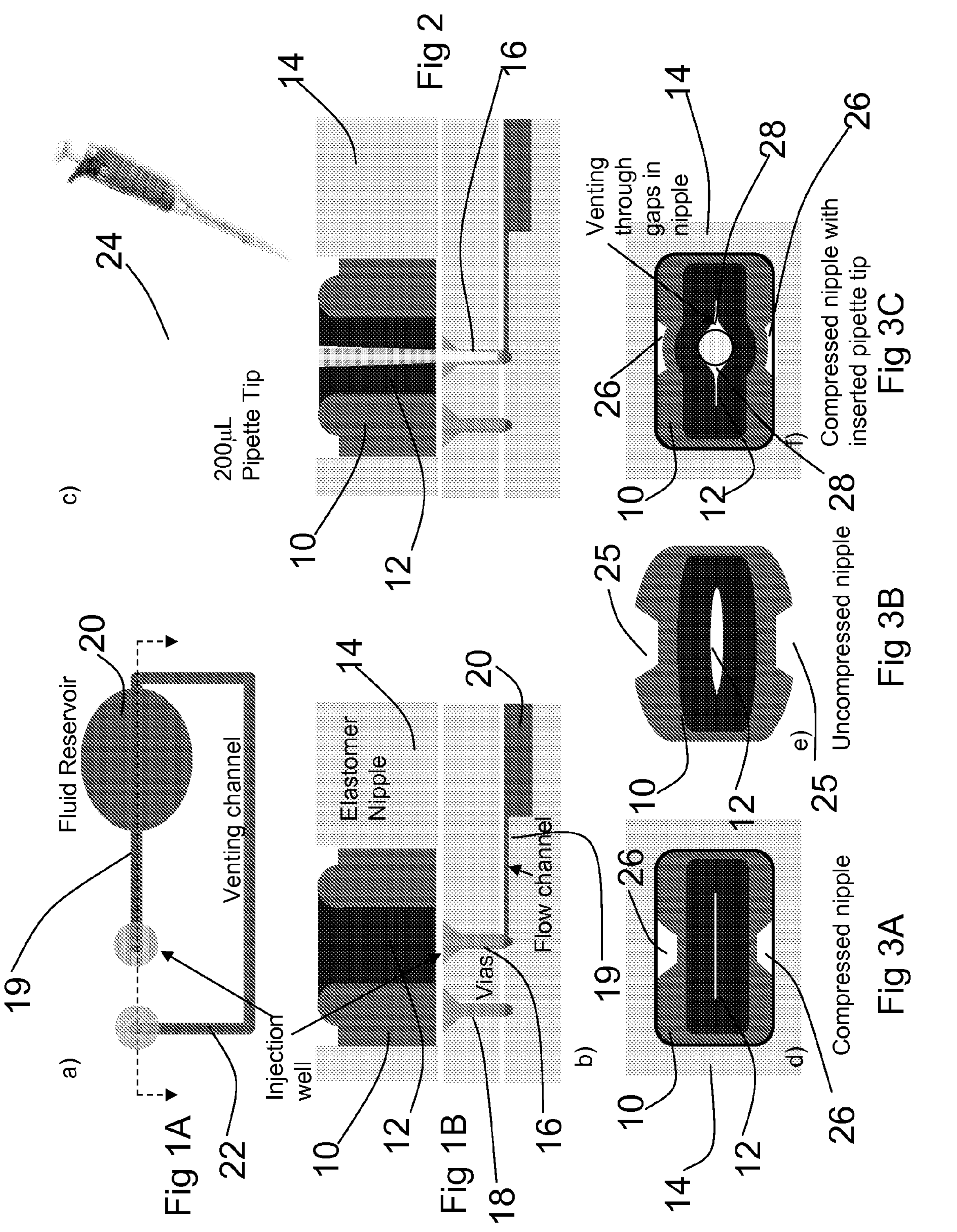
FIG. 1A is a plan view of the fluid injection port according to one embodiment of the invention.
FIG. 1B is a cross-sectional view of an embodiment of the invention disclosed herein.
FIG. 2 is a cross-sectional view of this embodiment with a pipette inserted.
FIG. 3A is a plan view of the elastomeric nipple while compressed and sealed.
FIG. 3B is a plan view of the uncompressed elastomeric nipple.
FIG. 3C is a plan view of the compressed elastomeric nipple with pipette tip inserted.

With reference first to FIGS. 1A, 1B, 3A, 3B, and 3C, an elastomeric nipple 10 includes a slit 12. The elastomeric nipple is supported within a compression fitting 14. The nipple 10 is disposed in a sealing relationship above a first via 16 and a second via 18. The first via 16 is in fluid communication with a flow channel 19 that extends into a fluid reservoir 20. The second via 18 is in communication with a vent channel 22 that is also in communication with the reservoir 20.

In its uncompressed and undeformed state as shown in FIG. 3B, the nipple 10, has an open slit 12. When inserted into the compression housing 14 as shown in FIGS. 1B and 3A, the nipple 10 is in a compressed but undeformed state, with the slit 12 is closed. The nipple 10 is in a sealing relation with both the first via 16 and the second via 18.

With reference now to FIGS. 2 and 3C, a pipette, for example, a 200 μL pipette 24 has been inserted through the slit 12 and into the via 16. In this configuration, the pipette 24 is sealed against the via 16 allowing fluid to be delivered through the flow channel 19 and into the fluid reservoir 20. Because of the shape of the elastomeric nipple 10, which has cutouts 25, its confinement within the compression fitting 14 leaves spaces 26 between the nipple 10 and the compression housing 14 for the nipple 10 to deform with the insertion of the pipette 24. The deformation of the nipple 10 and slit 12 when the pipette tip is inserted opens gaps 28 on either side of the pipette 24 where the slit 12 no longer seals so that the via 18 is in fluid communication with the outside air allowing air in the reservoir 20 to be discharged through vent channel 22 and the gaps 28 as fluid is delivered by the pipette into the fluid reservoir 20. The shape of the nipple 10 is chosen such that when inserted into a rectangular housing, sufficient compressive force will seal the central slit 12 closed while also allowing space 26 for the nipple 10 to expand when the pipette tip 24 is inserted. When the pipette tip 24 is removed, the slit 12 is closed, which isolates the fluid reservoir 20, and channels 19 and 22 from the external environment.

The self-sealing and self-venting injection port therefore allows easy, sterile injection of fluids into fluidic devices using standard laboratory pipettes, or automated pipetting tools. In particular, a closed chamber can be filled with a single pipette tip, without the requirement of manually introducing an opening to vent the air from the chamber as it is displaced by the injected fluid.

The self-sealing and self-venting injection port disclosed herein will be useful for the commercial development of cell culture array tools or cell-based assays requiring long-term incubation.

It is recognized that modifications and variations of the present invention will be apparent to those of ordinary skill in the art and it is intended that all such modifications and variations be included within the scope of the appended claims.

The invention claimed is:

1. Fluid injection port comprising:

an elastomeric injection nipple supported within a compression fitting, the injection nipple including a slit;

a first via connecting the slit in the nipple to a flow channel leading into a fluid reservoir;

a venting channel in fluid communication with the fluid reservoir and in fluid communication with a second via;

wherein upon insertion of a pipette tip into the slit in the injection nipple, the nipple deforms allowing the second via to be in fluid communication with the external environment whereby air can be discharged.

* * * * *